United States Patent [19]

Riazuelo et al.

[11] Patent Number: 5,032,028
[45] Date of Patent: Jul. 16, 1991

[54] FLUID FILM BEARING

[75] Inventors: Serge Riazuelo, Montberon; André Jambou, Castelginest; Francois Thomas, Toulouse; Christian Malabre, Labarthe sur Leze, all of France

[73] Assignee: ABG Semca S.A., Toulouse, France

[21] Appl. No.: 408,648

[22] Filed: Sep. 18, 1989

[30] Foreign Application Priority Data

Sep. 20, 1988 [FR] France .................... 88 12251

[51] Int. Cl.$^5$ .................................. F16C 32/06
[52] U.S. Cl. .................................. 384/103; 384/106
[58] Field of Search ............. 384/103, 104, 105, 106

[56] References Cited

U.S. PATENT DOCUMENTS

| | | | |
|---|---|---|---|
| 3,635,534 | 1/1972 | Barnett | 384/106 |
| 3,893,733 | 7/1975 | Silver et al. | 384/106 |
| 4,005,914 | 2/1977 | Newman | 384/103 |
| 4,195,395 | 4/1980 | Silver et al. | 384/106 X |
| 4,213,657 | 7/1980 | Gray | 384/105 |
| 4,475,824 | 10/1984 | Glaser et al. | 384/106 |
| 4,526,483 | 7/1985 | Hishikawa et al. | 384/103 X |
| 4,552,466 | 11/1985 | Warren | 384/103 |
| 4,701,060 | 10/1987 | Gu | 384/106 |

FOREIGN PATENT DOCUMENTS 1421 1/1985 Japan .................... 384/103

Primary Examiner—Thomas R. Hannon
Attorney, Agent, or Firm—Harold H. Dutton, Jr.

[57] ABSTRACT

The invention relates to a fluid film bearing and to a process for its production.

The invention relates to a hydrodynamic fluid film bearing formed between a plurality of sheets (3) fixed to a casing (5) and a shaft (6) in rotation with respect to said casing. The invention has as an object to completely dissociate the control of the radial rigidity of the bearing in the startup phase and that in the rotational phase at working speed.

A low rigidity, negligible or zero of the sheets (3) permits limiting the application forces of the sheets against the shaft and thus to reduce the wear upon startup of the bearing. After startup, the rotation of the shaft (6) at the interior of the sheet (3) causes a displacement of the sheets (3) which separate from the shaft (6) by the interposition of a hydrodynamic film of air. The new position occupied by the sheets (3) causes a return of the force of the sheets (3) by the restraining elements (4), as for example of leaf springs (40, 41, 42 or 43).

The invention is applied in particular to all conventional applications of fluid film bearings of the known type, as for example motors or rotating machines equipping aircraft.

The invention is further applicable to the provision of bearings susceptible of rotating at low speed, and/or susceptible of supporting high loads.

1 Claim, 5 Drawing Sheets

FLUID FILM BEARING

BACKGROUND AND OBJECTS OF THE INVENTION

This invention relates principally to a fluid film bearing and to a process for its production.

It is known to provide a bearing comprising a shaft capable of rotating with respect to a casing. When stopped, a plurality of sheets is applied against the shaft forming wedges containing a fluid, for example air. The rotation of the shaft with respect to the sheets causes compression of the wedge of fluid creating a pressure cell. This results in the formation of a film of fluid between the sheets and the shaft. Once the film of fluid is formed, the bearing presents a very low resistance coupling and no wear of the sheets.

For good operation of the bearing, it is imperative that the fluid film between the sheets and the shaft never be destroyed, in particular by unbalance of the bearing, by the weight of the shaft, by vibrations, by acceleration and by the gyroscopic effects resulting from the rotation of the shaft or of the casing and the displacement of the bearing, for example rising in an aircraft.

In bearings of the known type, the stability of the fluid film is obtained by a radial rigidity or stiffness of the sheets which compress the fluid film.

This type of system presents a number of disadvantages.

The application force of the sheets against the shaft increases the resistance of the bearing to start of rotation.

For overcoming these disadvantages, it is known to cover the sheets with a solid layer limiting the coefficient of friction between the sheets and the shaft.

In spite of this, the sizeable resistance to starting causes:

a significant wear of the sheets, a consumption of energy upon starting, a heating at the start risking deterioration of the lubricating layers, a starting of the bearing at a higher speed.

Moreover, the radial stiffness of the sheets does not permit operation of the bearing at low speeds, since the film of air only forms at higher speeds.

In a bearing according to the present invention, the radial stiffness of the sheets is optimized, in particular at low speeds. The optimization of the radial stiffness of the sheets is permitted, if it proves necessary, by the presence of external restraining elements permitting maintaining a radial stiffness of the bearing when the sheets are separated from the shaft by the formation of the fluid film.

DESCRIPTION OF THE INVENTION

In a first embodiment according to the present invention, the sheets are no longer subject to any constraints upon start-up, their maximum separation under the action of the fluid film is limited by stop shoulders of the casing. This type of provision permits a very simple construction and a very low wear upon start-up of the bearing. It presents the disadvantage of a very low stability at working speed and a low load capacity.

In a second variation of the apparatus according to the present invention, restraining means, for example springs, maintains the radial stiffness at high speeds, after separation of the sheets from the shaft. The restraining means does not begin to act until after the start-up phase, for example because of the limited range of force, by their geometry or by the presence of stops limiting the range of travel of the springs.

This variation is particularly advantageous to the extent that it presents all of the advantages of the known type of bearings with additionally:

a limiting of wear upon startup, a reduction of energy needed for starting rotation of the bearing, the limiting of heating of the sheets which permits retaining the film of the coating limiting the coefficient of friction at the time of startup, reducing the duration of the startup phase or the need for drive motors of lower power, extending downwardly the range of useable speeds of the bearing by the earlier formation of the film of air.

A third embodiment of the bearing according to the present invention, the total radial stiffness of the bearing is distributed between the sheets and the restraining elements. The dissociation of the radial stiffness at low and high speed permits all of the optimizations as for example permitting the shaft to form a non-zero angle with the casing if that is necessary.

The invention principally has for its object a bearing permitting the relative rotation of a shaft and a casing comprising a plurality of sheets or leaves susceptible of generating a fluid film about the shaft, characterized by the fact that a free fixation of the sheets permits their movement practically without restraint with respect to the shaft.

The invention also has as an object a bearing, characterized by the fact that the restraining means exerts a force on the sheets directed toward the shaft.

The invention also has as an object a bearing permitting the relative rotation of a shaft and a casing comprising a plurality of sheets capable of generating a fluid film about the shaft, characterized by the fact that it comprises restraining means participating in the rigidity of the bearing while exerting forces on the sheets directed toward the shaft, the sheets participating in the stiffness of the bearing by an elastic repelling force directed toward the shaft.

The invention also has as an object a bearing, characterized by the fact that it comprises force transmission elements restraining means to the sheets.

The invention also has as an object a bearing, characterized by the fact that the force transmission elements have a shape of revolution.

The invention also has as an object a bearing, characterized by the fact that the restraining means are springs.

The invention also has as an object a bearing, characterized by the fact that the springs are leaf springs.

The invention also has as an object a bearing, characterized by the fact that a first extremity of each leaf of a spring is secured to the casing and that a second extremity of each leaf of a spring exerts a force against a sheet directed toward the shaft.

The invention also has as an object a bearing, characterized by the fact that each leaf of the springs rests, at its extremities, on the casing and exerts a force, directed toward the shaft, on the sheets, essentially in the middle of each leaf.

The invention also has as an object a bearing, characterized by the fact that the spring has a polygonal force.

The invention also has as an object a bearing, characterized by the fact that the number of sides of the polygon formed by the leaf spring is equal to the number of sheets of the bearing and that each side of the leaf of the spring exerts a force directed toward the shaft on the sheets essentially in the middle of each side.

The invention also has as an object a bearing, characterized by the fact that the sheets surround the force transmission elements.

The invention also has as an object a bearing, characterized by the fact that the sheets fixed by one of their extremities to the casing have a support casing secured to the casing and with a force transmission piece.

The invention also has as an object a bearing, characterized by the fact that each sheet is secured at one of its extremities with the casing at the level of the extremity of the leaf spring.

The invention also has as an object a bearing, characterized by the fact that the force exerted by the restraining means has a lower modulus than the repelling force of the sheets in such a manner as to permit the axis of the shaft to form an angle not zero with the axis of the casing.

The invention also has as an object a bearing, characterized by the fact that leaf of the spring forms a chamber containing a compressible fluid, the fluid playing the role of a damping device during displacements of the leaf.

The invention also has as an object a bearing, characterized by the fact that the same fluid forms a film around the shaft and permits damping the movements of the leaves of the springs.

The invention also has as an object a process for producing a fluid film bearing, characterized by the fact that it comprises the following steps:

freely fixing the sheets, calibrating the restraining means according to the capacity of the desired load.

DESCRIPTION OF THE DRAWINGS

The invention will be better understood by means of the description hereinafter and the accompanying drawings, given by way of non-limiting example, in which:

In FIGS. 1 to 6, the same reference characters have been used to designate the same elements.

DESCRIPTION OF PREFERRED EMBODIMENTS

Figure 1:
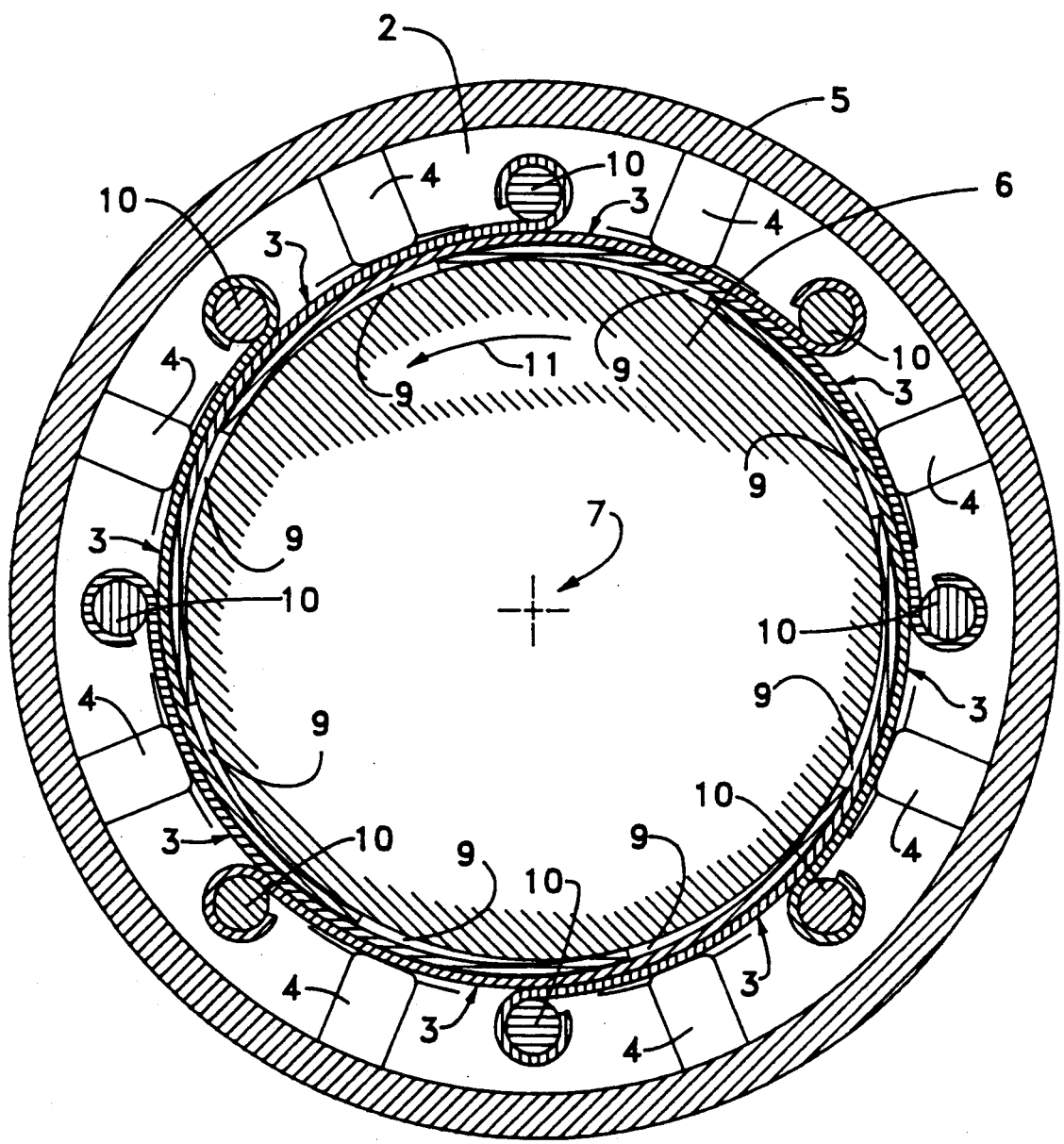
FIG. 1 is a sectional view illustrating the principle of the operations of the bearing according to the present invention.

In FIG. 1 may be seen an embodiment of a bearing according to the present invention. This bearing comprises a cylindrical shaft 6 with an axis 7. About the shaft is arranged a plurality of sheets 3, preferably metallic. In the non-limiting examples shown in the drawings, the bearing comprises eight sheets 3. By overlapping, two successive sheets form a wedge 9 filled with the ambiant fluid, for example air, at atmospheric pressure, or a compressed gas. The sheets 3 are fixed by the securing elements 10. For example, as shown in FIG. 1, each extremity of the sheets 3 is rolled around a securing cylinder 10. The rotation of the sheets 3 around a cylinder 10 is free, or quasi free. A very weak repelling force assures before startup a contact between the sheets 3 and the shaft 6, with a negligible resisting force.

The bearing comprises an external casing 5 with respect to which the shaft 6 rotates.

The bearing, according to the present invention, comprises preferably a plurality of restraining means 4, for example secured to the casing 5.

The sheets 3 are covered by a solid film reducing the coefficient of friction between the sheets 3 and the shaft 6. The film is for example made of PTFE.

Upon beginning of rotation of the shaft 6, the direction indicated by the arrow 11, the speed of the fluid increases in proportion as the shaft gains speed. The variation of speed of the fluid causes an overpressure which tends to cause a separation of the sheets 3 from the shaft 6. In the case where the forces which at this moment oppose the separation of the sheets 3 from the shaft 6 are slight or negligible, they form, even for low rotational speeds of the shaft 6, a fluid film. Beginning from this moment, there is no longer any contact between the sheet 3 and the shaft 6 thus avoiding any wear and reducing considerably the friction. When the speed of rotation of the shaft 6 increases, the sheets 3 support a greater force. To keep the film of fluid compressed, it is necessary to prevent the sheets 3 from separating too far from the shaft 6. The restraining means 4 acts on the sheets 3 separated from the shaft 6; the restraining means 4 only have a very slight, or no, action on the sheet 3 when they are in contact with the shaft 6.

Preferably, restraining means 4 is arranged on the sheets 3, for example eight, in the examples shown in the drawings.

In a variation of the bearing 6 in the present invention, the restraining means 4 are stops limiting the travel of the leaves 3. This variation presents the advantage of a very simple construction but does not present against but a very low load capacity.

In a second embodiment of the bearing according to the present invention, the restraining means 4 comprises springs. For example, helical springs are used arranged for example between the casing 5 and the points of the sheets 3 arranged essentially at equal distance from two attaching points 10.

It will also be understood to use other types of springs. Several examples of arrangements of leaf springs are illustrated in FIGS. 2 to 5.

Figure 2:
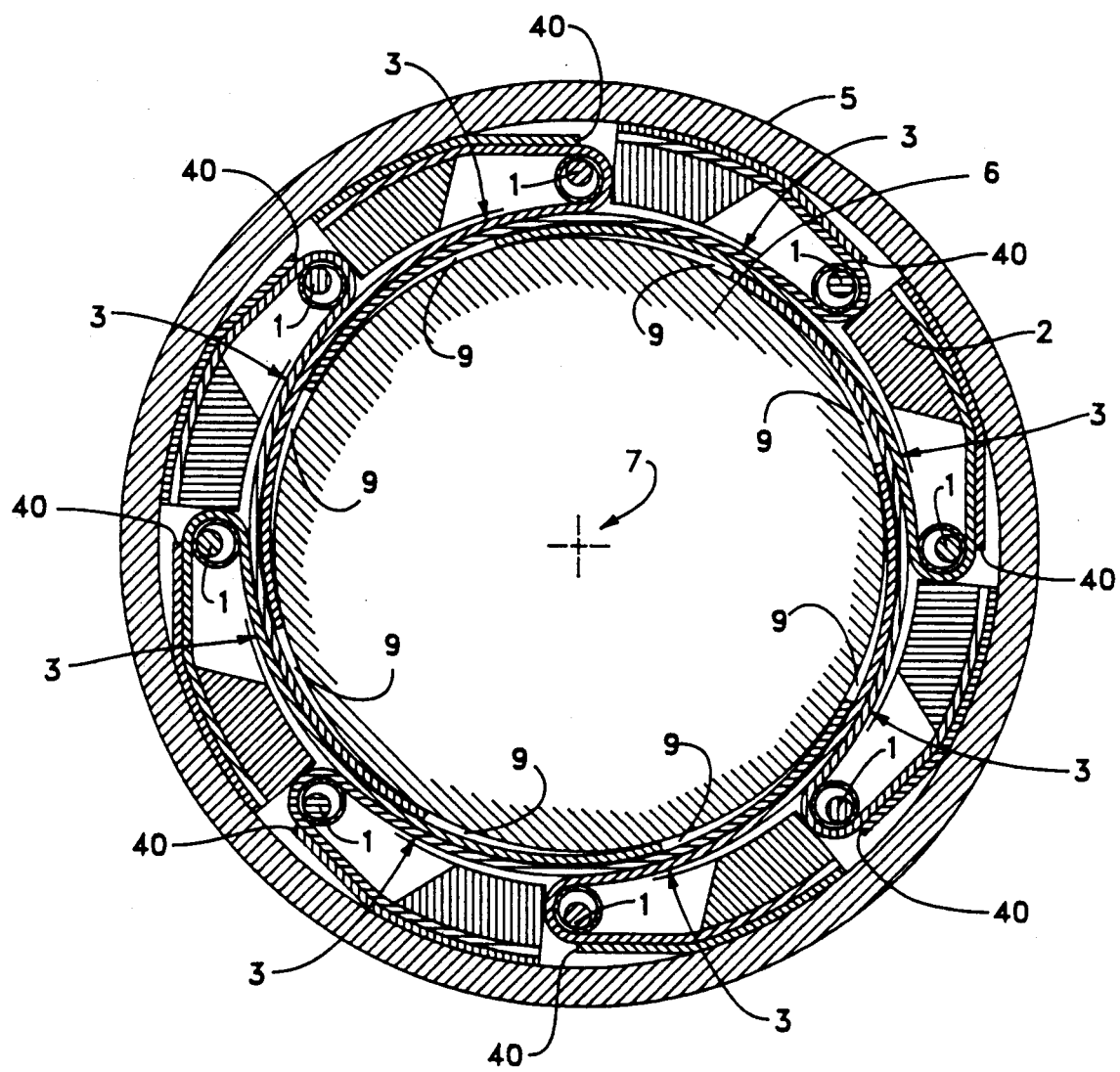
FIG. 2 is a sectional view of a first embodiment of the apparatus according to the present invention.

In FIG. 2, one may see an example of an embodiment of a bearing according to the present invention comprising a leaf spring 40. In the embodiment of FIG. 2, one of the extremities of a leaf spring 40 is secured with the casing 5. The other extremity is supported on a movement transmission piece 1 which itself is supported on the sheets 3. When the sheets 3 are in contact with the shaft 6, the spring 40 no longer touches the movement transmission piece 1. By contrast while separating, the sheet 3 comes to be supported, for example, by the intermediary of pieces 1, on the leaves of the spring 40. Thus, from this moment, the stiffness of the bearing increases very greatly without having impeded the startup. Preferably, the force transmission elements are pieces of revolution, which permits their machining by turning, for example cylinders. The rotary machining permits rectifying with precision the force transmission elements 1 for obtaining the production tolerance necessary to the operation of the bearing. In the embodiment shown in FIG. 2, the sheet 3 passes around the force transmission elements 1 for being secured with the casing 5. Preferably this securing is done at the level of securing one of the extremities of the leaf springs 40. Thus, a weak force is provided, but sufficient to lay the sheets 3 against the shaft 6 in the absence of rotational movement. This weak force is obtained by the choice of materials and the lengths of the sheets 3 having for example a hairpin shape. The fact of laying, even weakly, the sheets 3 against the shaft 6 may be necessary for the formation of the wedge 9 necessary to the formation of the fluid film between the shaft 6 and the sheets 3. According to the present invention, in bearings intended to replace conventional bearings, the elastic forces provided by the leaf springs 40 will be clearly superior to the elastic forces laying the sheets against the shaft 6.

Figure 3:
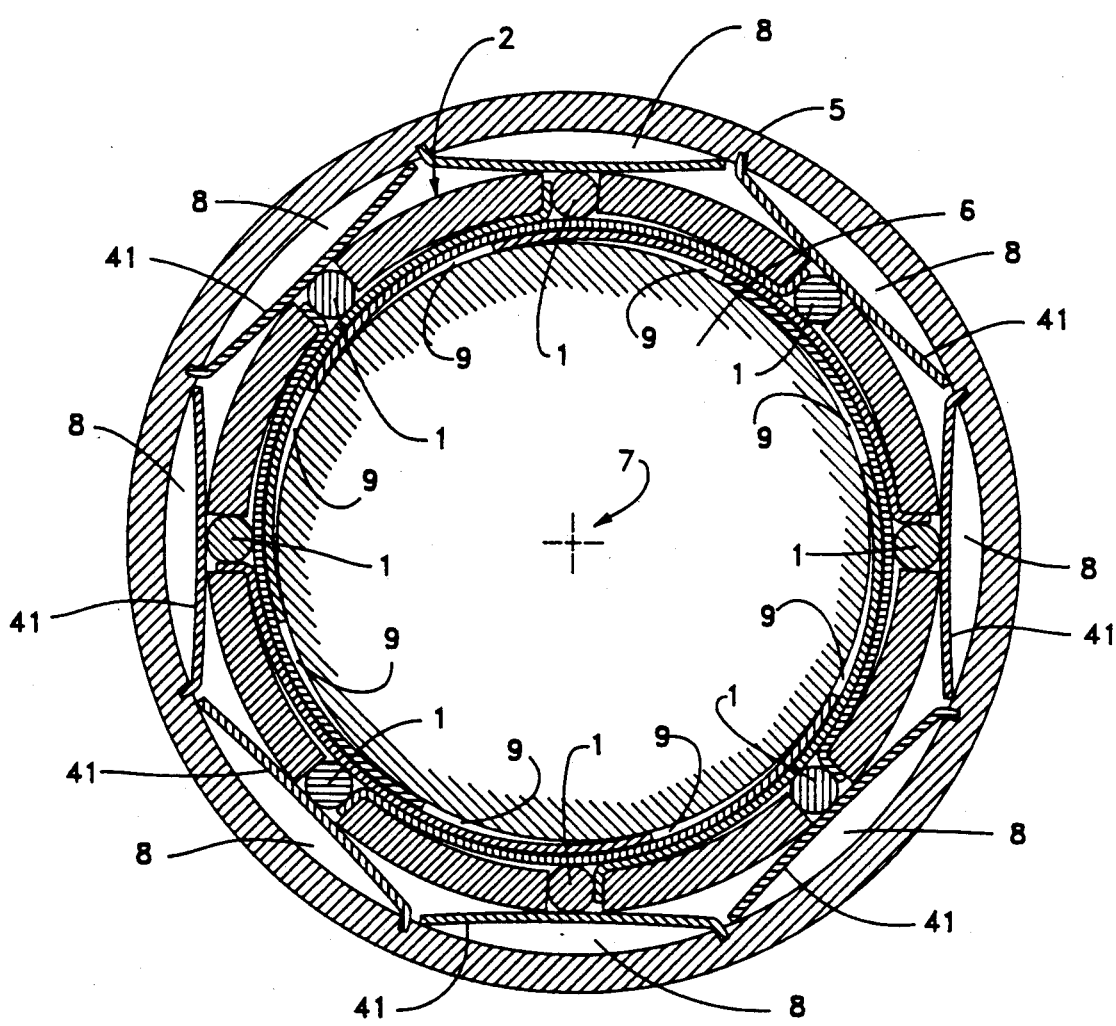
FIG. 3 is a sectional view of a second embodiment of the bearing according to the present invention.
Figure 4:
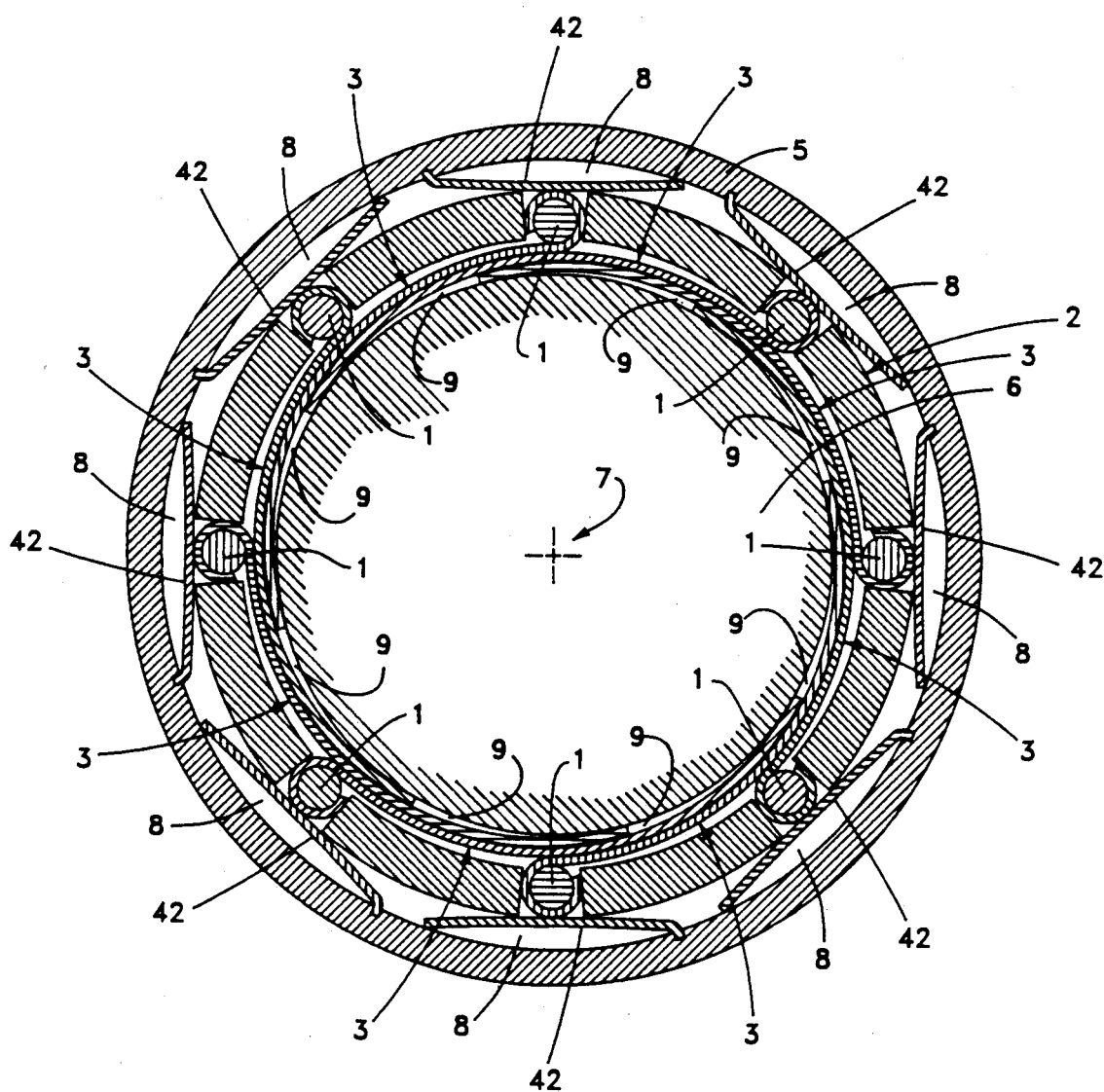
FIG. 4 is a sectional view of a third embodiment of a bearing according to the present invention.

In FIG. 3, an embodiment of a bearing according to the present invention may be seen comprising a support housing 2 inside of the casing 5. The support housing 2 permits keeping the force transmission pieces 1 in place between the sheets 3 and the leaf springs 41 resting by their extremity on the casing 5. In the example shown in FIG. 3, one of the extremities of each leaf spring 41 is secured to the casing 5. This extremity penetrates for example the internal wall of the casing 5. In the embodiment shown in FIG. 3, the sheets 3 have essentially a form of the arc of a circle. The arc of the circle is extended at one of its extremities by a planar part which is for example secured between the force transmission elements 1 and the support housing 2.

The leaf springs 41 rest on the force transmission piece 1. However, a pre-loading is given to the spring 41 by the support housing 2 which limits the travel of the spring 41 in the direction of the axis 7 of the shaft 6. When the sheets 3, under the action of a rotation of the shaft 6 with respect to the casing 5 separate from the shaft 6, they rest on the force transmission elements 1 which themselves rest on the leaf springs 41. The leaf springs 41 resist a very great separation of the sheets 3. They assure the radial stiffness of the bearing according to the present invention.

Preferably, the leaf springs 41 form chambers 8 filled with a fluid. The fluid is for example air at atmospheric pressure, air under high pressure, carbon dioxide gas, or nitrogen. Preferably, the fluid enclosed by the chamber 8 is the same as that which exists in the entire enclosure of the bearing according to the invention. The fluid 8 is compressed when the sheets 3 rest on the springs 41. Thus it constitutes a damper permitting absorption of vibrations.

Figure 5:
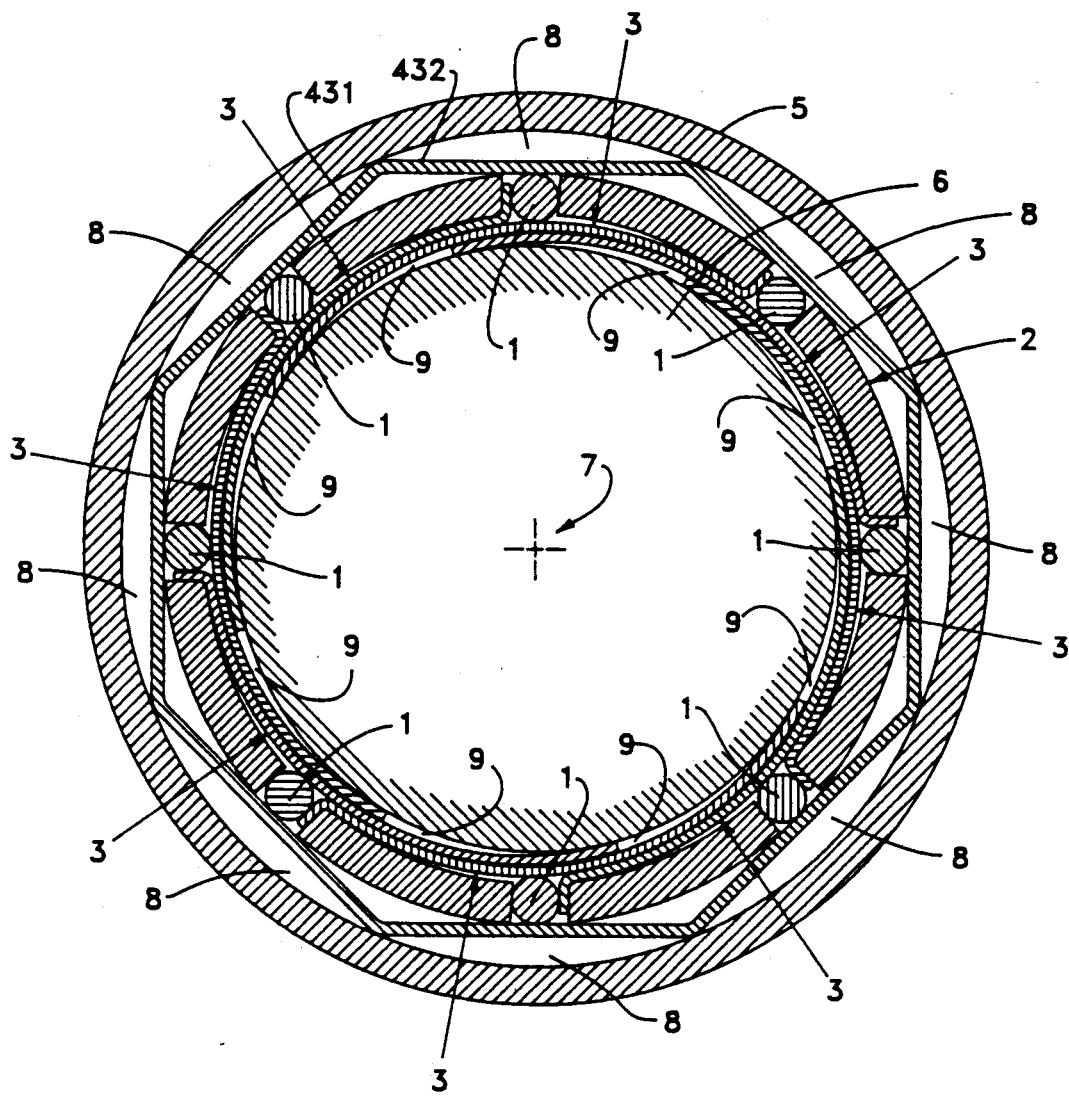
FIG. 5 is a sectional view a fourth embodiment of a bearing according to the present invention.

In FIG. 5, another embodiment is seen of a bearing according to the present invention, comprising a unique spring 43 forming a polygon. In the example shown in FIG. 5, we provide eight leaves 3, eight force transmission elements 1, the leaf springs 43 form an octagon. Preferably, each force transmission element 1 is situated in the middle of one side of the octagon. The device of FIG. 5 permits an easy assembly by positioning the two extremities 431, 432 of the spring 43 as shown. Moreover, the sealing of the chambers 8 is improved by the use of polygonal springs. In a variation not shown, the extremities 431 and 432 are sealed for increasing the dampening furnished by the chambers 8 while assuring a supplementary insulation. Advantageously, the extremities of the chambers 8 which are seen in cross-section in FIGS. 3, 4 and 5, comprise means assuring their seal with, for example, a joint.

In the non-limiting example shown in FIG. 5, the securing of the extremities of the sheets 3 is similar to that shown in FIG. 3. By contrast, the example shown in FIG. 4, springs essentially identical to springs 41 of FIG. 3 are used; but the securing of the sheets are obtained by a rolling of their ends about the force transmission pieces 1.

Figure 6:
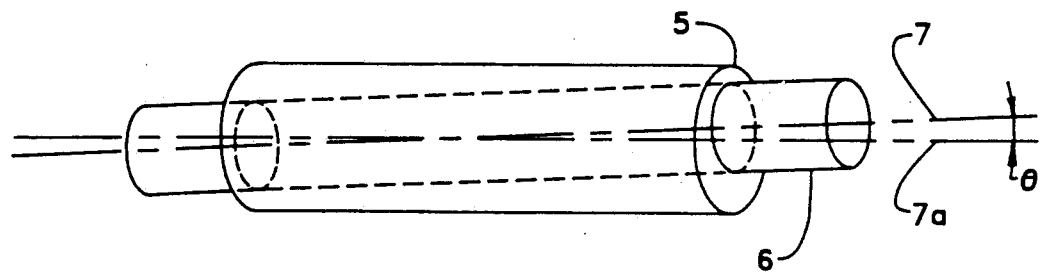
FIG. 6 is a perspective view illustrating the possibilities of the operation of a fifth embodiment of a bearing according to the present invention.

In most cases, it is desirable that the axis of the casing 5 and the axis of the shaft 6 be parallel. However, it may prove useful, as shown in FIG. 6 to permit a deflection of the angle $\theta$ between the axis 7 of the shaft 6 and the axis 7a of the casing 5. This deflection of the angle $\theta$ permits, for example, absorbing shocks due to external forces or to permit manufacturing tolerances. To permit a displacement of the angle $\theta$, the device of FIG. 2 may be used, for example, in which the rigidity of the sheets 3 is not negligible. In certain cases, if one wishes to increase the angle $\theta$, a stiffness of the sheets greater than that furnished by the spring 40 is used. The bearings permitting a displacement of the angle $\theta$, between the axis 7a of the casing 5 and the axis 7 of the shaft 6, without notable reduction in the load capacity of the fluid film between the sheets 3 and the shaft 6, are completely new and allow for bearings according to this invention applications which for the moment would be completely prohibited for gas bearings.

The invention also has for an object a process for production of bearings according to the present invention. This process consists in determining and applying the constraints necessary for the good operation of the bearing. The determination of the constraints is determined by a conventional calculation of the mechanics as a function of the desired characteristics of the bearing. The fact of having completely dissociated the control of the stiffness of the bearing in the startup phase from that of high speed rotation permits acting in an independent manner on these two parameters for obtaining bearings with greater performance. The bearing according to the present invention is applied to all devices using conventional bearings as for example in aircraft.

In the case where the sheets 3 of the bearing are not subject to any constraints at the level of their attachment before the formation of the fluid film the wear is less for each startup. After startup, the rotation of the shaft 6 creates a hydrodynamic film of air which modifies the position occupied by the sheets 3 and causes a resumption of the effort at the level of the force transmission elements by the restraining elements 4, as for example the springs 40, 41, 42, 43. It is thus possible to achieve the bearings while having lesser precision of machining to that existing for the bearings of a conventional type. These two conditions permit using the bearing according to the present invention in new applications prohibited for conventional type bearings for the transmission of movement, for example for the replacement of ball bearings or roller bearings particularly in vehicles, the movement transmission devices, electrical generators or turning machines. In the same manner, the reduction of the constraints exerted to startup on the sheets 3 permit the formation of the fluid film at low rotational speed. This permits improvement of the advantages of fluid film bearings for applications at low speeds prevented with the conventional bearings. The bearings according to the present invention, may be adapted to these new applications, if that proves necessary.

We claim:

1. A bearing for enabling the relative rotation of a shaft and a housing supporting said shaft, comprising:

a plurality of leaves partially overlapping in such a manner as to be able to generate a fluid film about said shaft, each leaf being adapted to be able to exert an elastic repelling force directed toward the shaft, leaf securing elements for securing said leaves in said housing in such a manner as to permit radial movement thereof, restraining springs bearing against said housing and said leaf securing elements for transmitting toward said elements forces directed toward the shaft and weaker in modulus than the elastic repelling forces of the leaves.

* * * * *